United States Patent
Pratt (10) Patent No.: US 8,042,849 B2
(45) Date of Patent: Oct. 25, 2011

(54) DEVICE AND METHOD FOR LIFTING A POOL SKIMMER BASKET

(75) Inventor: Richard C Pratt, Gorham, ME (US)

(73) Assignee: ODAT Machine, Inc., Gorham, ME (US)

( * ) Notice: Subject to any disclaimer, the term of this patent is extended or adjusted under 35 U.S.C. 154(b) by 441 days.

(21) Appl. No.: 12/079,275

(22) Filed: Mar. 26, 2008

(65) Prior Publication Data

US 2009/0243318 A1 Oct. 1, 2009

(51) Int. Cl.
*A47F 13/06* (2006.01)
(52) U.S. Cl. .................................................. 294/19.3
(58) Field of Classification Search ............ 294/24, 294/19.1, 19.3, 29, 34; 81/488
See application file for complete search history.

(56) References Cited

U.S. PATENT DOCUMENTS

| | | | |
|---|---|---|---|
| 829,304 A | 8/1906 | Tilton | |
| 1,128,245 A | 2/1915 | Hamrin | |
| 1,339,257 A | 5/1920 | Callahan | |
| 2,007,039 A | 7/1935 | Dickson | |
| 2,029,185 A | 1/1936 | Panoff | |
| 2,809,578 A * | 10/1957 | Campbell | 99/312 |
| 3,583,744 A | 6/1971 | Paine | |
| 4,059,033 A | 11/1977 | Johnson | |
| 4,209,903 A | 7/1980 | Owens | |
| 4,230,357 A * | 10/1980 | Bosch et al. | 294/19.1 |
| 4,573,378 A | 3/1986 | McDonald | |
| 4,802,391 A | 2/1989 | Willhoite et al. | |
| 5,116,093 A | 5/1992 | Burns | |
| D329,969 S | 10/1992 | Kemp | |
| 5,566,998 A | 10/1996 | Gray | |
| 5,752,730 A | 5/1998 | Allen | |
| 5,806,903 A | 9/1998 | George | |
| 5,899,514 A | 5/1999 | York et al. | |
| 5,937,453 A * | 8/1999 | Hodak et al. | 4/508 |
| 5,957,514 A | 9/1999 | Brookshire | |
| 6,422,623 B1 | 7/2002 | Thomas | |
| 6,457,557 B1 | 10/2002 | Anderson et al. | |
| 6,490,749 B1 * | 12/2002 | Morad | 15/145 |
| 6,592,756 B1 | 7/2003 | Felix, Jr. et al. | |

* cited by examiner

*Primary Examiner* — Charles A Fox
(74) *Attorney, Agent, or Firm* — Pierce Atwood, LLP; Kevin M. Farrell; Katherine A. Wrobel (57) ABSTRACT

The present invention is directed to a skimmer basket lifting tool that enables a user to engage and remove a skimmer basket for cleaning without having to contact the debris accumulated within the basket. The skimmer basket lifting tool comprises a lifting handle which has both a proximal and a distal end, a base portion, including an attachment point for engaging the distal end of the lifting handle, and a pair of opposed skimmer basket crossbar engagement elements extending downward from the base portion. The opposed crossbar engagement elements are oriented such that rotation of the base portion, following insertion of the base portion into a skimmer basket housing, results in reversible engagement of the opposed crossbar engagement elements with the skimmer basket crossbar. This reliable, reversible engagement enables the skimmer basket to be lifted from the skimmer basket housing.

15 Claims, 8 Drawing Sheets

DEVICE AND METHOD FOR LIFTING A POOL SKIMMER BASKET

BACKGROUND

1. Field of the Invention

The present invention relates generally to a tool and method for removing or replacing a swimming pool skimmer basket.

2. Discussion of Background Information

Maintaining the cleanliness of a swimming pool is a continuous maintenance task. One method for removing the debris that collects in the pool involves using a skimmer net attached to an extension pole. Typically, many pools utilize a skimmer basket, disposed within a skimmer basket well to filter the water. Filtration occurs as pool water is pumped through the perforated pool skimmer basket before returning to the pool. Over time, the skimmer basket collects filtered debris, reducing the efficiency of the filtration process. Returning the system to peak efficiency requires removal, emptying and cleaning of the skimmer basket. Removing the skimmer basket manually is a task which many find to be offensive. The skimmer basket and the surrounding skimmer basket housing are often filled with twigs, leaves and other debris, and frequently contains insects and animals such as frogs or even snakes. Some of these animals are alive, but others are in various stages of decay.

Various tools have been proposed in the art for the removal of pool skimmer baskets. Although presumably effective for their intended purpose, these tools fail to allow a user to effectively and reliably secure a skimmer basket crossbar for effective removal of the skimmer basket. For example, one prior art embodiment contains non-opposing hooks that are designed to engage a skimmer basket crossbar during basket removal. This non-opposing hook configuration results in unreliable engagement of the skimmer basket crossbar. For example, devices that utilize non-opposing hooks are prone to engaging only one hook with the skimmer basket crossbar. Such engagement is inherently unreliable and leads to spillage of the filtered debris back into the filtered water during lifting. Moreover, even when the non-opposing hooks of the prior art tool both engage the skimmer basket crossbar, off center alignment can cause the skimmer basket to tip, spilling the basket contents back into the filtered pool water.

Other prior art devices disclose opposed engagement members, but require a user to place his or her hand in the debris-filled water to engage and lift the basket reliably without dumping the basket contents into the clean pool water. These devices lack a means for carefully engaging the hooks to avoid spilling the contents of the skimmer basket during the lifting process.

Therefore, a need exists for a tool that securely and reliably engages the crossbar of a pool skimmer basket so that the basket may be removed for cleaning without dumping the filtered debris back into the clean pool water and without requiring the user to touch the skimmer basket or the skimmer basket housing.

SUMMARY OF THE INVENTION

The present invention solves the problems associated with removing debris from pool skimmer baskets and provides a reliable device and method for removing and replacing a skimmer basket.

The present invention is directed to a skimmer basket lifting tool that enables a user to engage and remove a skimmer basket for cleaning without having to contact the debris accumulated within the basket. The skimmer basket lifting tool comprises a lifting handle which has both a proximal and a distal end, a base portion, including an attachment point for engaging the distal end of the lifting handle, and a pair of opposed skimmer basket crossbar engagement elements extending downward from the base portion. The skimmer basket lifting tool may further comprise a hand grip element attached to the proximal end of the lifting handle. The opposed crossbar engagement elements are oriented such that rotation of the base portion, following insertion of the base portion into a skimmer basket housing, results in reversible engagement of the opposed crossbar engagement elements with the skimmer basket crossbar. This reliable, reversible engagement enables the skimmer basket to be lifted from the skimmer basket housing.

The present invention is also directed to a method for using a skimmer basket lifting tool. First, the method comprises a step of providing a skimmer basket lifting tool comprising a lifting handle having a proximal and a distal end, a base portion, the base portion including an attachment point for engaging the distal end of the lifting handle and a pair of opposed skimmer basket crossbar engagement elements extending downward from the base portion. The opposed crossbar engagement elements are oriented such that rotation of the base portion, following insertion of the base portion into a skimmer basket housing, results in reversible engagement of the opposed crossbar engagement elements with the skimmer basket crossbar, thereby enabling the skimmer basket to be lifted from the skimmer basket housing. The method further comprises lowering the skimmer basket lifting tool into the skimmer basket housing and rotating the skimmer basket lifting tool such that the opposed crossbar engagement elements reversibly engage with the skimmer basket crossbar. Once the skimmer basket lifting tool has engaged the skimmer basket crossbar, the method further comprises lifting the skimmer basket from the skimmer basket housing.

BRIEF DESCRIPTION OF THE DRAWINGS

These and other features, aspects and advantages of the present invention will become better understood with reference to the following description, appended claims, and accompanying drawings where:

DETAILED DESCRIPTION

The present device and method allow a user to remove a pool skimmer basket for cleaning without requiring that the user touch the skimmer basket or the skimmer basket housing. Specifically, the device of the present invention reversibly engages the crossbar of the pool skimmer basket, such that lifting the tool can be used to lift the skimmer basket from the skimmer basket housing without spilling the skimmer basket contents.

Figure 1:
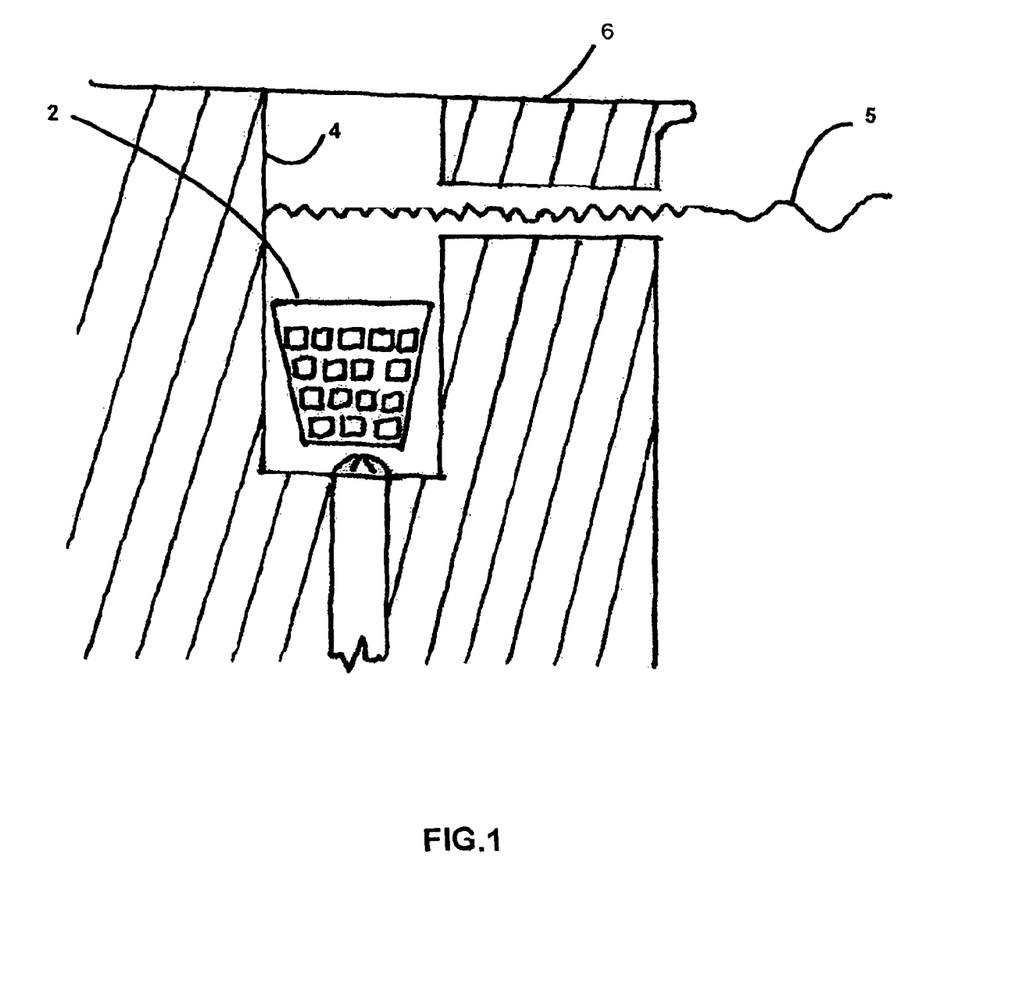
FIG. 1 shows an exemplary skimmer basket disposed within an exemplary skimmer basket housing.
Figure 2:
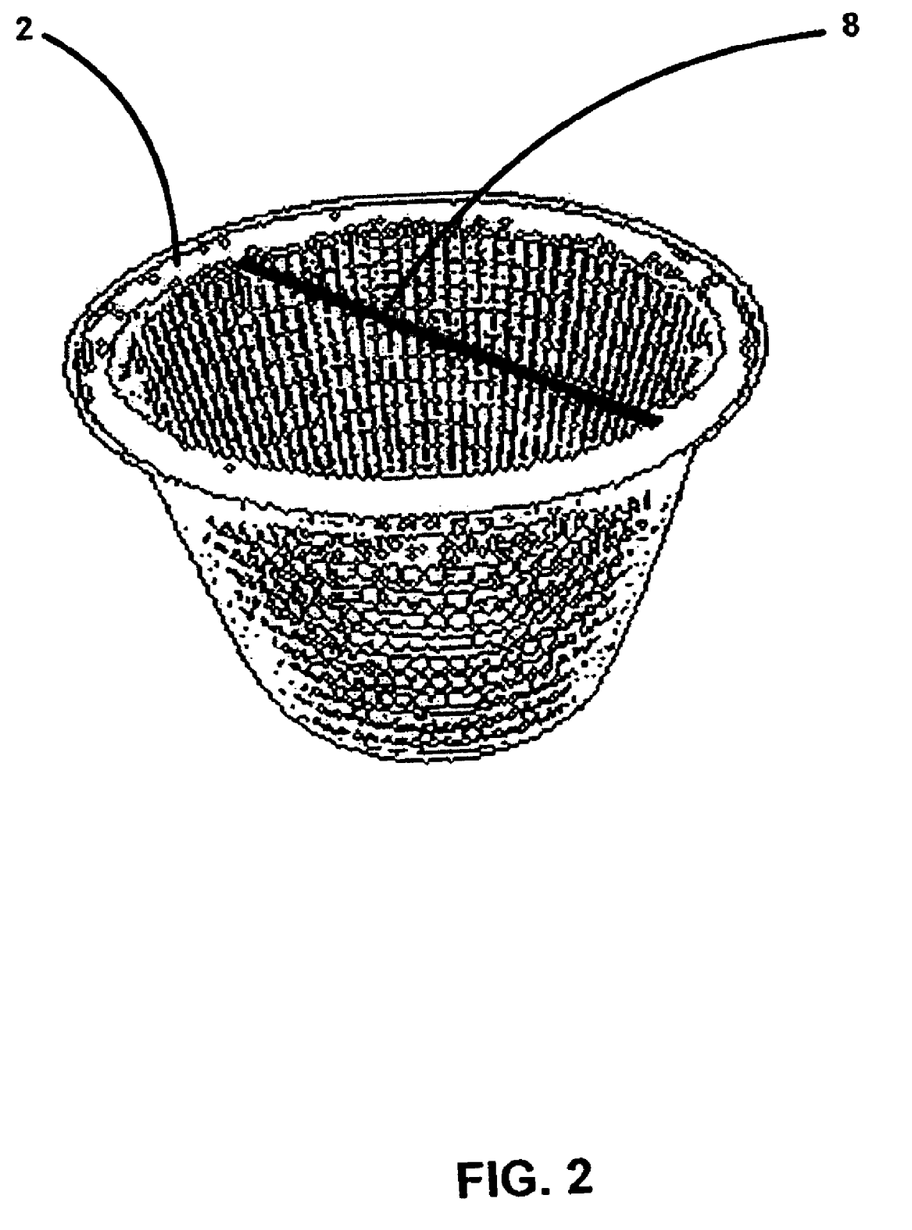
FIG. 2 shows a perspective view of an exemplary skimmer basket and skimmer basket crossbar.

FIGS. 1 and 2 show a typical skimmer basket 2 and a typical skimmer basket housing 4. The skimmer basket housing 4 extends below the pool deck 6 so that pool water 5 is pumped through the skimmer basket 2, which effectively filters the pool water 5. While disposed in the skimmer basket housing 4, the skimmer basket 2 is positioned such that the skimmer basket 2 lies completely below the surface of the pool water 5. During normal operation, the pool water 5 flows through the skimmer basket 2 for filtration before returning to the pool. As depicted in FIG. 2, to facilitate removal for cleaning, the skimmer basket 2 typically comprises a straight skimmer basket crossbar 8 disposed within the skimmer basket 2. Typically, the user reaches down below the surface of the pool water 5 to grab hold of the skimmer basket crossbar 8. Reaching down below the surface of the pool water 5 to grip the skimmer basket crossbar 8 is an undesirable task because a user must reach into the debris collected inside the skimmer basket housing 4. Furthermore, the skimmer basket 2 and the skimmer basket crossbar 8 are often obscured due to the presence of debris in the pool water 5, and the user must feel around in the filtered debris to locate the skimmer basket crossbar 8.

Figure 3:
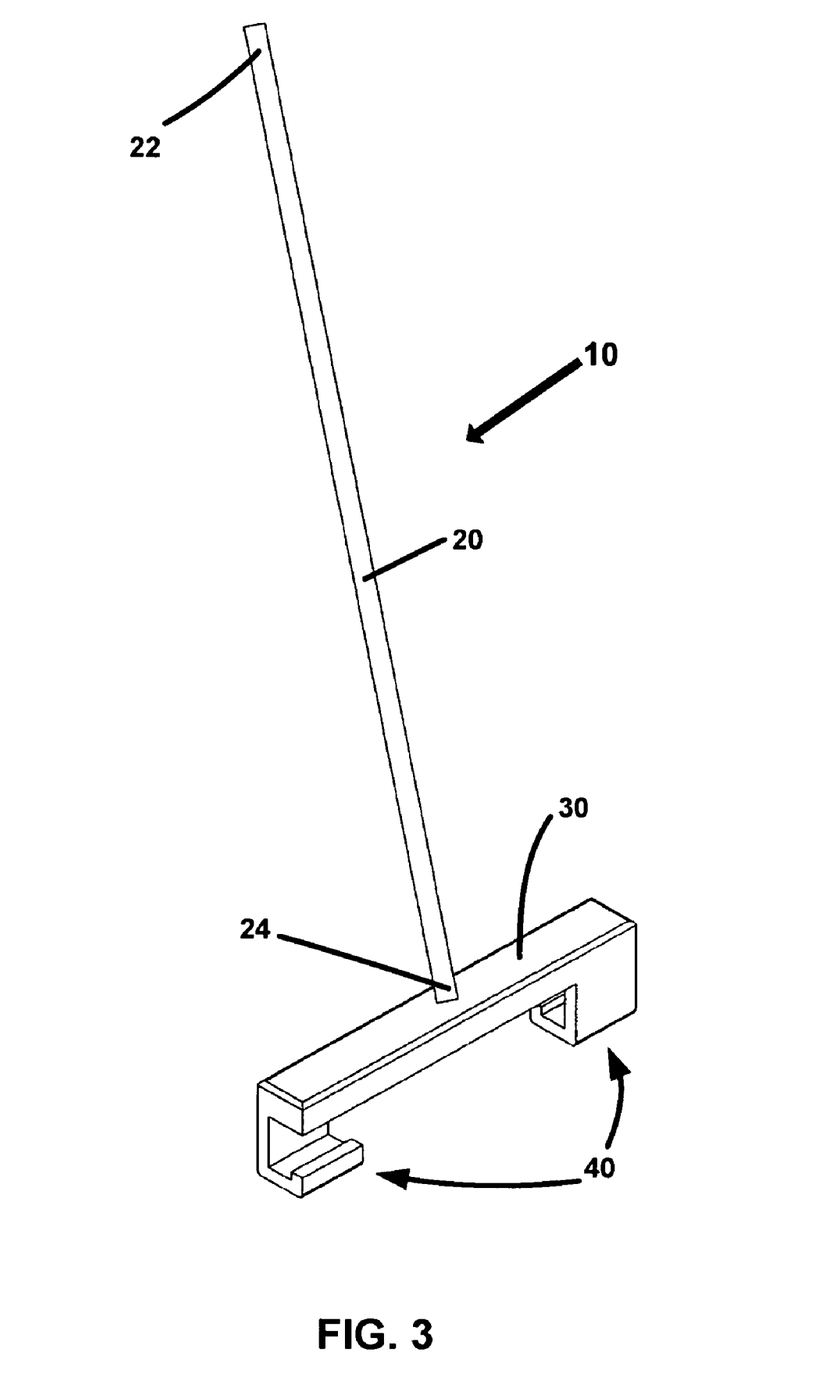
FIG. 3 shows a perspective view of one embodiment of the present invention.

The present invention addresses the problems surrounding reliably engaging the skimmer basket crossbar 8 without requiring the user to place a hand in the pool water 5. FIG. 3 shows one embodiment of a skimmer basket lifting tool 10 of the present invention. The skimmer basket lifting tool 10 comprises a lifting handle 20, a base portion 30 and a pair of opposed crossbar engagement elements 40. The lifting handle 20 comprises a proximal end 22 and a distal end 24. The distal end 24 is adapted to engage the base portion 30. Persons skilled in the art will appreciate that the lifting handle 20 may extend sufficiently so that a user need not place a hand in the pool water 5 to engage the skimmer basket crossbar 8. The lifting handle 20 may be of variable length to accommodate various sized users so that no bending is required during the process of removing the skimmer basket 2. Preferably, the lifting handle 20 is manufactured so that the lifting handle 20 may be easily and inexpensively reproduced. Additionally, the lifting handle 20 may be light weight and water resistant to facilitate lifting the already heavy, wet basket of filtered debris and to ensure the durability of the lifting handle 20 for its intended use. Examples of suitable materials for the lifting handle 20 include, but are not limited to wood, plastic, metal, composite or combinations thereof. Further, examples of durable plastic materials that would be suitable for formation of the lifting handle 20 include, but are not limited to, polyhydroxybutyrate plastic, polystyrene, polymethyl methacrylate, nylon, acrylic, low density polyethylene, high density polyethylene, polypropylene, polyvinyl chloride, silicone, and polyurethane.

Figure 4:
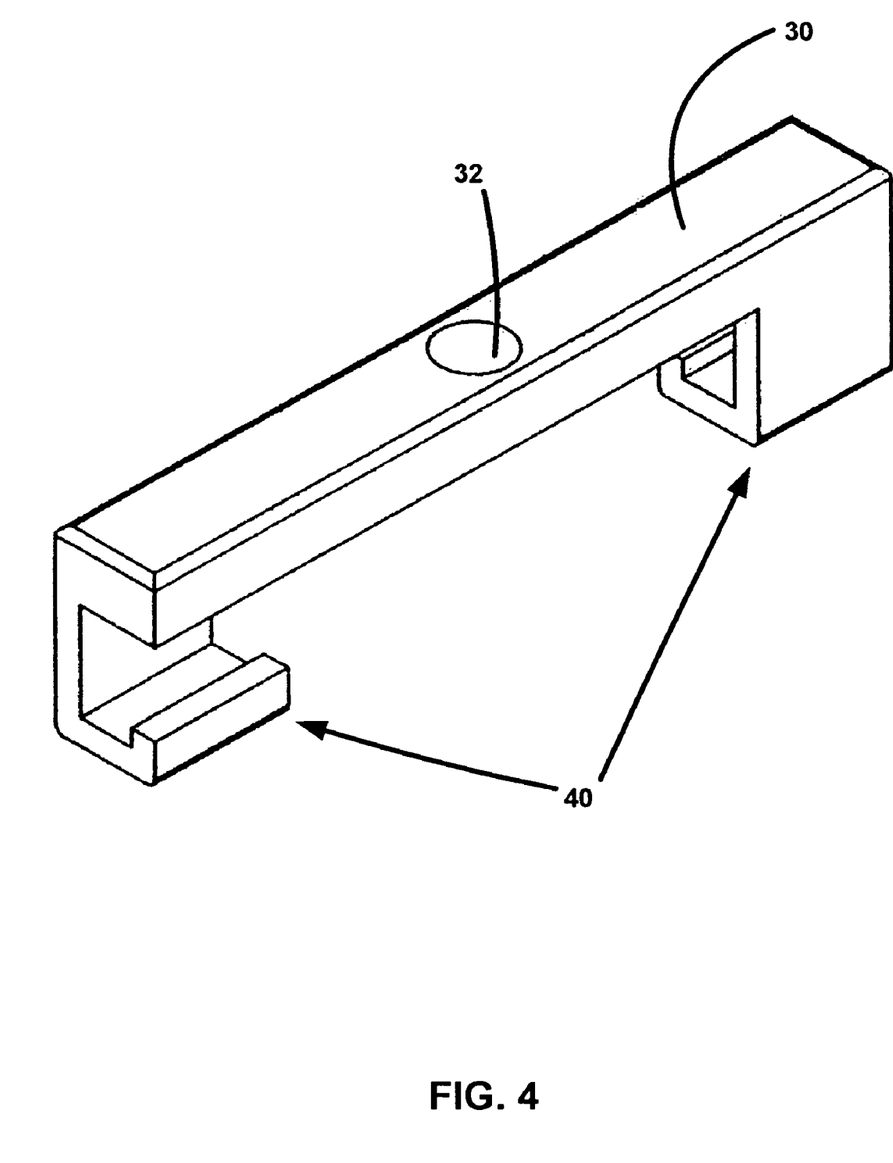
FIG. 4 shows a perspective view of an element of the embodiment of the present invention shown in FIG. 3.
Figure 5:
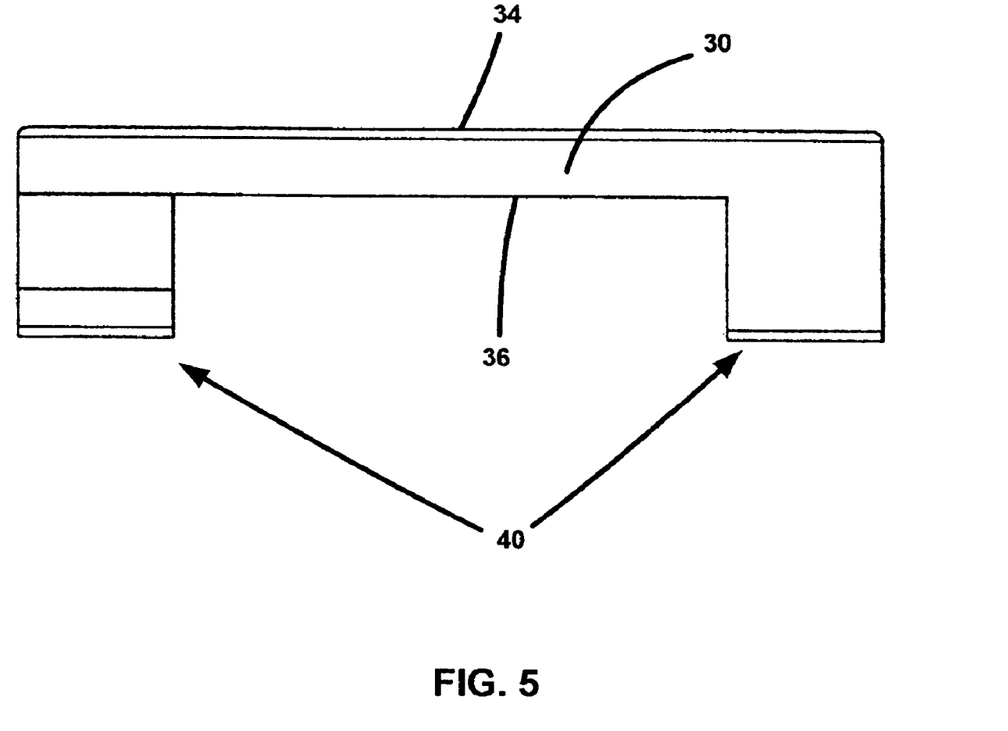
FIG. 5 shows a front view of an element of the embodiment of the present invention shown in FIG. 3.

Turning now to FIGS. 4 and 5, which show an embodiment of the base portion 30 and the pair of opposed crossbar engagement elements 40, the base portion 30 includes an attachment point 32 for engaging the distal end 24 of the lifting handle 20. Although the attachment point 32 depicted in FIG. 4 is a circular cavity, alternative embodiments of the present invention may utilize other shapes or sizes that would facilitate the engagement of the distal end 24 of the lifting handle 20 and the base portion 30. Further, one skilled in the art will understand that the attachment point 32, which is depicted substantially in the center of the base portion 30, may be in alternative locations without reducing the efficacy of the basket lifting tool 10 and without deviating from the spirit and scope of the present invention. The distal end 24 is adapted to engage the base portion 30 at the attachment point 32. For example, the distal end 24 may be tapered, threaded, sized or otherwise adapted to engage the base portion 30 via attachment point 32. Additionally, the distal end 24 may be permanently attached to the base portion 30 via press fitting, mechanically fastening or gluing. Alternatively, the distal end 24 and the attachment point 32 may be threaded to facilitate semi-permanent attachment of the lifting handle 20 to the base portion 30.

The base portion 30 includes an upper surface 34 and a lower surface 36. In the embodiment shown in FIG. 5, the upper surface 34 and the lower surface 36 of the base portion 30 are both substantially planar. However, those skilled in the art will appreciate that the upper surface 34 and lower surface 36 of the base portion 30 may be non-planar. Additionally, one skilled in the art will appreciate that the base portion 30, which is depicted in FIG. 4 as substantially rectangular, may take other forms without deviating from the spirit and scope of the present invention. For example, the base portion 30 may be circular, elliptical or any other shape that would fit within the confines of the skimmer basket housing 4. Thus, the tool could be modified for other uses such as hydroponic farming or sewage treatment.

Preferably, the base portion 30 is designed for simple and inexpensive reproduction. For example, the base portion 30 may be machined, extruded or injection molded in a simple two-part mold. Additionally, the base portion 30 may be lightweight and water resistant to facilitate lifting the already heavy, wet skimmer basket 2 full of filtered debris and to ensure the durability of the base portion 30 for its intended use. Examples of suitable materials for the base portion 30 include, but are not limited to wood, plastic, metal, composite or combinations thereof. Further, examples of durable plastic materials that would be suitable for formation of the base portion 30 include, but are not limited to, polyhydroxybutyrate plastic, polystyrene, polymethyl methacrylate, nylon, acrylic, low density polyethylene, high density polyethylene, polypropylene, polyvinyl chloride, silicone, and polyurethane.

In a preferred embodiment the crossbar engagement elements are configured in a hook-type design. FIGS. 4 and 5, for example, depict the opposed crossbar engagement elements 40 as "squared" hooks with right angle bends. One of skill in the art will recognize, however, that non-right angle bends will perform equally well in connection with the present invention.

Referring to FIG. 5, it is useful to discuss a specific advantage of the present design relative to prior art embodiments with non-opposed crossbar engagement elements. In use, the tool of the present invention will be lowered into a skimmer basket housing which, in some instances, may be overloaded with debris. The overloading of the skimmer basket housing with debris can obfuscate the view of the skimmer basket crossbar. A significant advantage of the present invention lies in the ability of a user to securely engage a skimmer basket crossbar which cannot be clearly seen due the presence of debris in the skimmer basket housing.

This secure engagement under less than ideal conditions is effected, for example, by lowering the tool into the housing until the lower surface of the base portion 30 makes contact with the skimmer basket crossbar thereby preventing further advancement of the tool down into the skimmer basket housing. The overall length of the base portion 30 is preferably less than the inner diameter of the skimmer basket at the point of attachment of the skimmer basket crossbar. This will be recognized as inherent by one skilled in the art as the opposed crossbar engagement elements could not engage the crossbar if the base portion were so wide that the engagement elements made contact with the top surface of the skimmer basket before reaching the crossbar. Therefore, once the lower surface 36 of the base portion 30 makes contact with the skimmer basket crossbar, the tool is then rotated until the crossbar is engaged by the crossbar engagement elements 40.

The orientation of the crossbar engagement elements 40 as shown in the FIGS. 4 and 5, for example, would require counterclockwise rotation of the base portion, following initial contact between lower surface 36 and skimmer basket crossbar 8, in order for the tool to engage the crossbar. By reversing the orientation of the crossbar engagement elements, the tool could be designed for clockwise rotation to engage following initial contact between lower surface 36 and skimmer basket crossbar 8.

One of skill in the art will recognize that when considering the use of tools having non-opposed skimmer basket crossbar engagement elements, including those with a hook-type design, such as the tool of U.S. Pat. No. 6,422,623, the tool will be simply lowered into the well in a sweeping manner, then raised. Because the crossbar is not visible due to the presence of debris it is very likely that only one of a plurality of engagement elements will actually engage the crossbar. Raising the skimmer basket which is engaged by only a single hook-type engagement element will result in a tipping of the basket resulting in a spilling of debris into an unprotected skimmer basket housing. Under these circumstances spilled debris can be pulled through the filtration system plumbing and into the filter itself. At a minimum this will result in the need to clean the filter more frequently than would otherwise be required. It is also possible that some types of debris could actually damage the pool filter resulting in the need to replace this expensive element.

While the opposed crossbar engagement elements 40 are depicted as integrally attached to the base portion 30, alternative embodiments are within the scope of the present invention. For various reasons relating to cost, durability and method of manufacture it may be preferable to utilize opposed crossbar engagement elements 40 that are separately manufactured and then attached to the base portion 30. Accordingly, the opposed crossbar engagement elements 40 may be permanently attached to the base portion 30 via press fitting, mechanical fastening means or gluing. Alternatively, the opposed crossbar engagement elements 40 may be threaded to facilitate semi-permanent attachment to the base portion 30 so that a user can interchange embodiments of the opposed crossbar engagement elements 40.

Figure 6:
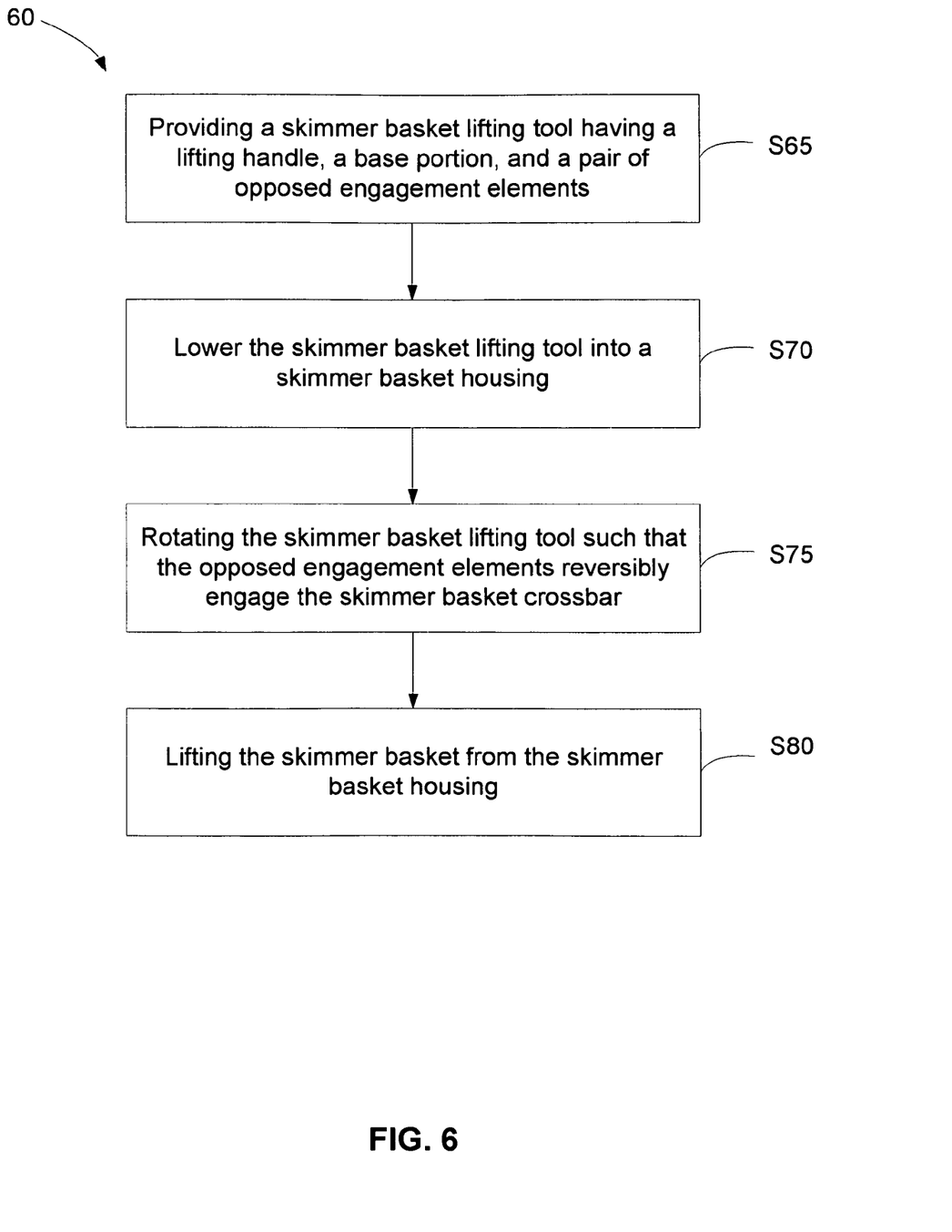
FIG. 6 shows the steps of one embodiment of the method of the present invention.

Turning now to FIG. 6, one embodiment of the method 60 of the present invention is depicted. A first step S65 comprises providing a skimmer basket tool 10, and a second step S70 comprises lowering the basket lifting tool 10 into a skimmer basket housing 4. As illustrated in FIG. 1, the skimmer basket 2 is generally installed in the skimmer basket housing 4 such that the skimmer basket 2 lies completely below the surface of the pool water 5. Accordingly, the present method comprises lowering the skimmer basket lifting tool 10 into the skimmer basket housing 4, through the surface of the pool water 5, and into the skimmer basket 2.

Once the skimmer basket tool 10 has been lowered into the skimmer basket housing 4, a third step S75 comprises rotating the skimmer basket tool 10 such that the opposed crossbar engagement elements 40 reversibly engage the skimmer basket crossbar 8. In the embodiment of the base portion 30 depicted in FIGS. 3 through 5, the user would rotate the skimmer basket lifting tool 10 in a counterclockwise direction in order to engage the opposed crossbar engagement elements 40 with the skimmer basket crossbar 8. In an alternative embodiment of the invention, the opposed crossbar engagement elements 40 may be aligned such that the user would rotate the skimmer basket lifting tool 10 in a clockwise direction to engage the opposed crossbar engagement elements 40 with the skimmer basket crossbar 8.

The lowering and rotating steps, i.e. the second step S70 and the third step S75, provide a user with indicia of proper alignment. Preferably, the second step S70, the lowering step, comprises lowering the skimmer basket tool 10 into the skimmer basket housing 4 until the base portion 30 of the skimmer basket tool 10 contacts the skimmer basket crossbar 8. One advantage of the present invention is that a user may perform the lowering step without substantial concern for alignment of the skimmer basket tool 10 and the skimmer basket crossbar 8. The physical contact of the base portion 30 with the skimmer basket crossbar 8 provides the user with positive feedback that the opposed crossbar engagement elements 40 of the skimmer basket lifting tool 10 will align properly with the skimmer basket crossbar 8 during the third step S75, i.e. the rotating step. The user holding the lifting handle 20 will feel resistance when the base portion 30 contacts the skimmer basket crossbar 8. The embodiment of the base portion 30 depicted in FIGS. 4 and 5 is well-suited to reliably engage a substantially straight skimmer basket crossbar 8 by lowering the lifting tool 10 until the lower surface 36 of the base portion 30 contacts the skimmer basket crossbar 8. However, the present invention also encompasses a base portion 30 that is curvilinear rather than substantially planar. A curvilinear base portion 30 would be especially suitable for situations where the skimmer basket lifting tool 10 is engaging a curved skimmer basket crossbar 8. One of skill in the art will recognize that the lower surface 36 of the base number 30 may be shaped or contoured in a myriad of ways while falling within the scope of the present invention. Downward extension of the opposed crossbar engagement elements 40 may be required to provide for engagement with some alternative contours of lower surface 36, but such designs are within the scope of the present invention.

A final method step S80 comprises lifting the skimmer basket from the skimmer basket housing. Because the skimmer basket engagement elements 40 engaged the skimmer basket crossbar 8 as a result of the second step S75, the completion of method step S80 merely requires that the user lift the skimmer basket lifting tool 10 from the skimmer basket housing 4 in order to remove the skimmer basket 2 from the skimmer basket housing 4.

Figure 7:
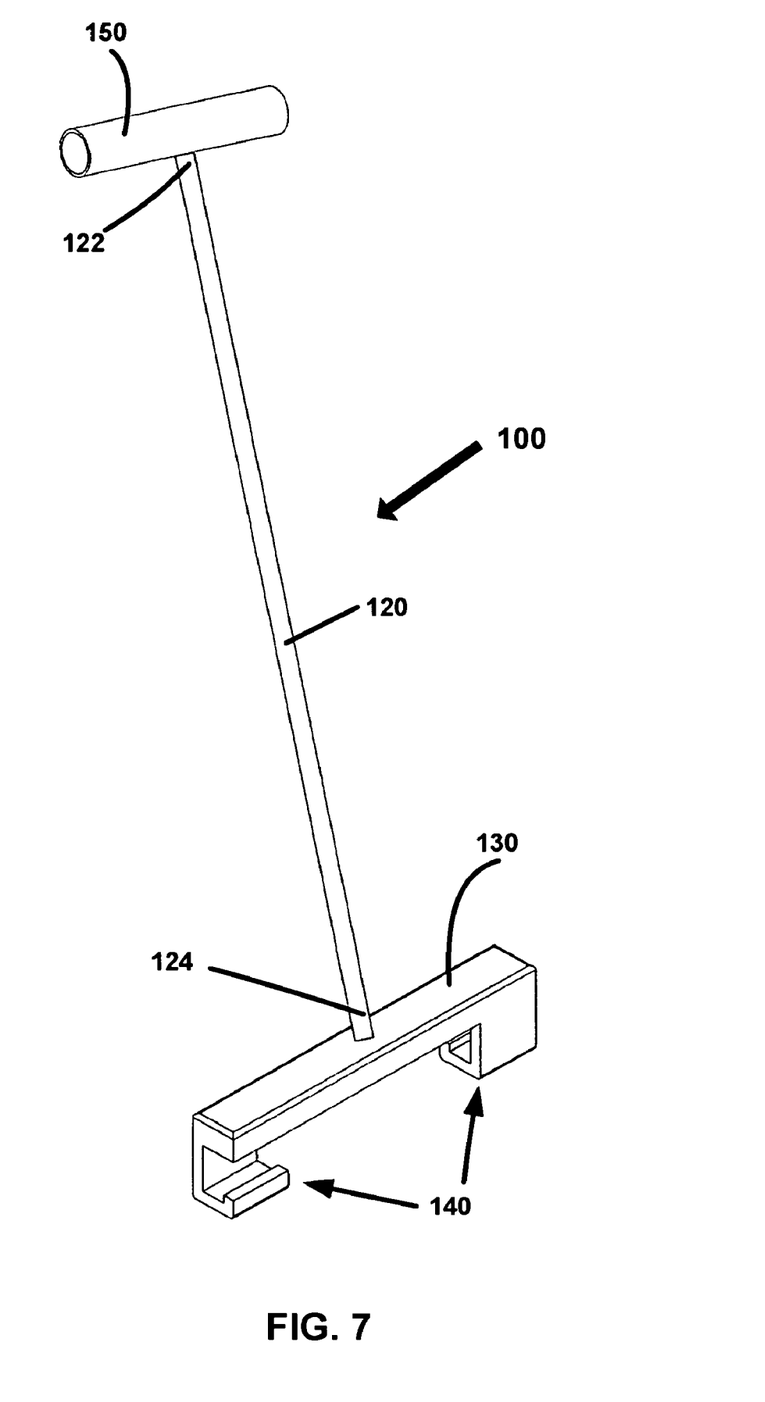
FIG. 7 shows a perspective view of one embodiment of the present invention.

Turning now to FIG. 7, an alternative embodiment of the skimmer basket lifting tool 100 of the present invention is depicted. This embodiment of the skimmer basket lifting tool 100 comprises a lifting handle 120, a base portion 130 and a pair of opposed crossbar engagement elements 140. The lifting handle 120 has a proximal end 122 and distal end 124. The distal end 124 is adapted to engage the base portion 130 in a manner substantial identical to manner of connection described for the distal end 24 and the base portion 30 described above with regard to the embodiment of FIGS. 3 through 5. The proximal end 122 is adapted to engage the hand grip 150. For example, the proximal end 122 may be tapered, threaded, sized or otherwise adapted to engage the hand grip 150. Additionally, the proximal end 122 may be permanently attached to the hand grip 150 via press fitting, mechanically fastening or gluing. Alternatively, the proximal end 122 may be threaded to facilitate semi-permanent attachment to the hand grip 150. Further, the lifting handle 120 is variably sized and manufactured in a manner similar to the lifting handle 20 of the embodiment of FIGS. 3 through 5.

Figure 8:
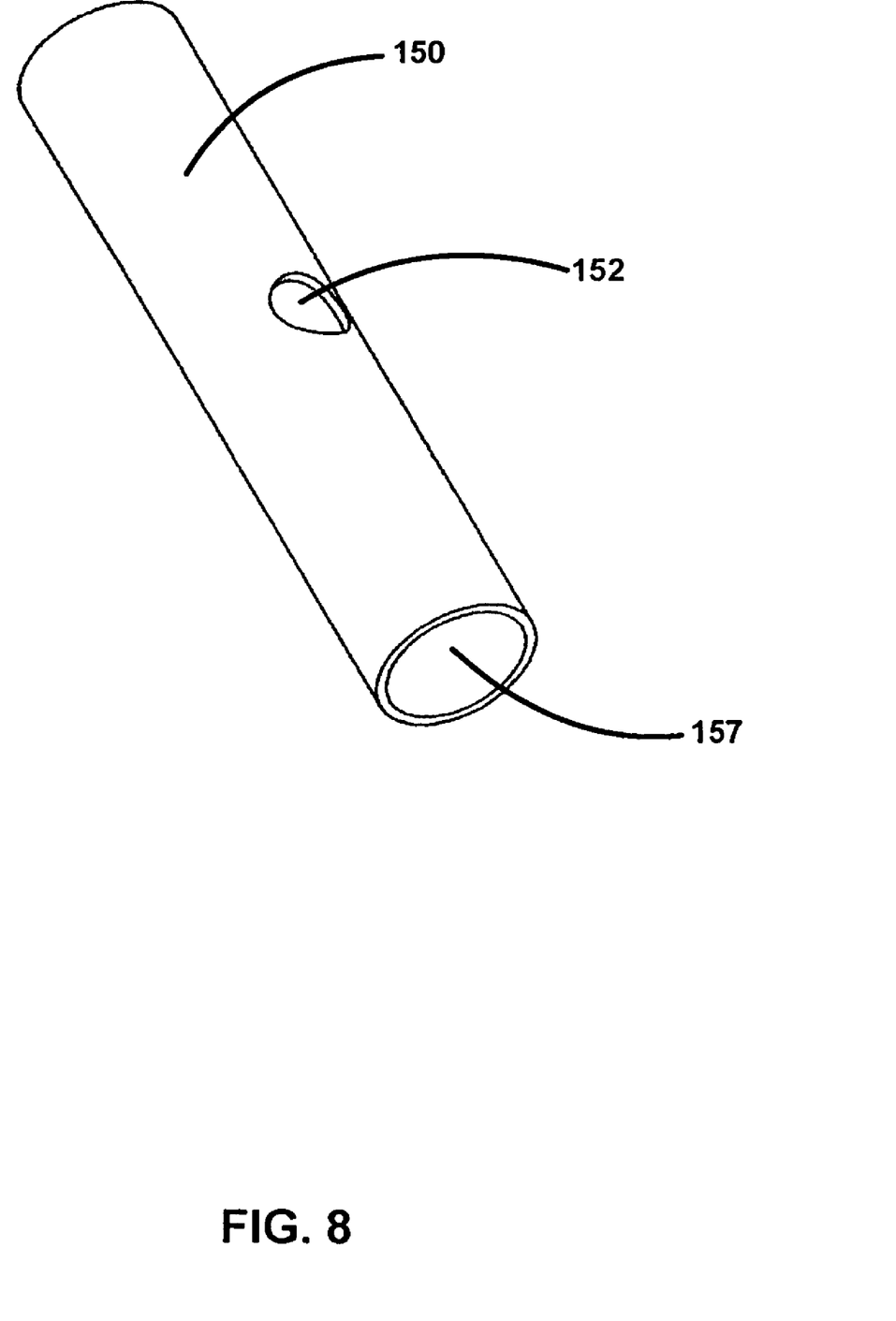
FIG. 8 shows a perspective view of an element of the embodiment of the present invention shown in FIG. 7.

FIG. 8 depicts an embodiment of the hand grip 150 of the skimmer basket lifting tool 100. The hand grip 150 includes an attachment point 152 for engaging the proximal end 122. Although attachment point 152 depicted in FIG. 7 is a circular cavity, alternative embodiments of the present invention may utilize other shapes or sizes that would facilitate the engagement of the proximal end 122 and the hand grip 150. As depicted, the hand grip 150 is a hollow, cylindrical element, with an open end 157. However, one skilled in the art will appreciate that alternatively, the hand grip 150 could be solid. The hand grip 150 of the skimmer basket lifting tool 100 provides certain benefits not present in the embodiment of FIG. 3. First, the hand grip 150 is preferably ergonomically adapted to fit comfortably in the user's hand. In addition, the hand grip 150 allows the user to easily provide additional torque when rotating the skimmer basket lifting tool 100 to facilitate engagement of the opposed crossbar engagement elements 140 with the skimmer basket crossbar 8. This is especially necessary in situations where there is a substantial amount of debris floating in the pool water 5 because excessive debris can obscure the skimmer basket crossbar 8 and increase the amount of torque required to rotate the skimmer basket lifting tool 100. Further, the hand grip 150 facilitates the process of lifting the skimmer basket 2 from the skimmer basket housing 4 because the hand grip 150 provides a reliable and secure hand position for the user during lifting.

Because the base portion 30, 130, the opposed crossbar engagement elements 40, 140 and the lifting handle 20, 120 are substantially similar between the alternative embodiments depicted in FIGS. 3 through 5 and FIGS. 7 and 8, the method for using the skimmer basket lifting tool 100 is substantially similar to the method described above with respect to FIG. 6.

It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

I claim:

1. A skimmer basket lifting tool, comprising:
   a) a lifting handle having a proximal and a distal end;
   b) a base portion, the base portion being a substantially rectangular prism and including an attachment point for engaging the distal end of the lifting handle and having a lower portion that is substantially planar for making direct contact with a skimmer basket crossbar; and
   c) a pair of opposed skimmer basket crossbar engagement elements offset from one another along the length of the base portion, extending downward from the base portion at opposite ends thereof, and oriented such that rotation of the base portion, following insertion of the base portion into a skimmer basket housing, results in reversible engagement of the opposed crossbar engagement elements with the skimmer basket crossbar, thereby enabling the skimmer basket to be lifted from the skimmer basket housing, wherein:
      i) the pair of opposed skimmer basket crossbar engagement elements are parallel squared hooks with planar interior and exterior surfaces oriented such that the planar bottom surface of each engagement element is parallel to the planar lower portion of the base portion and such that the outer side surface and outer back surface of each engagement element is coplanar with the outer side surface and outer back surface of the base portion;
      ii) the pair of opposed skimmer basket crossbar engagement elements each further comprise a planar front rim member oriented perpendicular to and extending upward from the planar bottom surface;
      iii) only the pair of opposed skimmer basket crossbar engagement elements extend downward from the base portion, and
      iv) the base portion and the pair of opposed skimmer basket crossbar engagement elements are formed from a monolithic mass of material such that no mechanical attachment means is required between the opposed engagement elements and the base portions.

2. The skimmer basket lifting tool of claim 1 wherein the attachment point for engaging the distal end of the lifting handle is located at about the center of the base portion.

3. The skimmer basket lifting tool of claim 1 further comprising a hand grip element attached to the proximal end of the lifting handle.

4. The skimmer basket lifting tool of claim 3 wherein the hand grip element is an elongated shaft oriented substantially perpendicular to the lifting handle.

5. The skimmer basket tool of claim 1 wherein at least the base portion of the skimmer basket lifting tool is manufactured from a material selected from the group consisting of plastic, metal, composite, wood or combinations thereof.

6. The skimmer basket tool of claim 5 wherein the plastic is selected from the group consisting of polyhydroxybutyrate plastic, polystyrene, polymethyl methacrylate, nylon, acrylic, low density polyethylene, high density polyethylene, polypropylene, polyvinyl chloride, silicone, and polyurethane.

7. The skimmer basket lifting tool of claim 6 wherein at least the base portion of the skimmer basket lifting tool is injection molded.

8. The skimmer basket lifting tool of claim 6 wherein at least the base portion of the skimmer basket lifting tool is extruded.

9. The skimmer basket lifting tool of claim 6 wherein at least the base portion of the skimmer basket lifting tool is machined.

10. A method for using a skimmer basket lifting tool comprising:
   a) providing a skimmer basket lifting tool comprising:
      i) a lifting handle having a proximal and a distal end,
      ii) a base portion, the base portion being a substantially rectangular prism and including an attachment point for engaging the distal end of the lifting handle and having a lower surface that is substantially planar for making direct contact with a skimmer basket crossbar, and
   b) a pair of opposed skimmer basket crossbar engagement elements offset from one another along the length of the base portion, extending downward from the base portion at opposite ends thereof, and oriented such that rotation of the base portion, following insertion of the base portion into a skimmer basket housing results in reversible engagement of the opposed crossbar engagement elements with the skimmer basket crossbar, thereby enabling the skimmer basket to be lifted from the skimmer basket housing, wherein:
  i) the pair of opposed skimmer basket crossbar engagement elements are parallel squared hooks with planar interior and exterior surfaces oriented such that the planar bottom surface of each engagement element is parallel to the planar lower portion of the base portion and such that the outer side surface and outer back surface of each engagement element is coplanar with the outer side surface and outer back surface of the base portion;
  ii) the pair of opposed skimmer basket crossbar engagement elements each further comprise a planar front rim member oriented perpendicular to and extending upward from the planar bottom surface;
  iii) only the pair of opposed skimmer basket crossbar engagement elements extend downward from the base portion, and
  iv) the base portion and the pair of opposed skimmer basket crossbar engagement elements are formed from a monolithic mass of material such that no mechanical attachment means is required between the opposed engagement elements and the base portions;
c) lowering the skimmer basket lifting tool into the skimmer basket housing until the lower surface of the base portion contacts the skimmer basket crossbar;
d) rotating the skimmer basket lifting tool such that the opposed crossbar engagement elements reversibly engage with the skimmer basket crossbar; and
e) lifting the skimmer basket from the skimmer basket housing.

11. The method of claim 10 wherein the attachment point for engaging the distal end of the lifting handle is located at about the center of the base portion.

12. The method of claim 10 further comprising providing a hand grip element attached to the proximal end of the lifting handle.

13. The method of claim 12 wherein the hand grip element is an elongated shaft oriented substantially perpendicular to the lifting handle.

14. The method of claim 10 wherein at least the base portion of the skimmer basket lifting tool is manufactured from a material selected from the group consisting of plastic, metal, composite, wood or combinations thereof.

15. The method of claim 14 wherein the plastic is selected from the group consisting of polyhydroxybutyrate plastic, polystyrene, polymethyl methacrylate, nylon, acrylic, low density polyethylene, high density polyethylene, polypropylene, polyvinyl chloride, silicone, and polyurethane.

* * * * *